March 13, 1956    M. G. STEELE    2,737,917
DEVICE FOR POSITIONING AND STRAIGHTENING
WIRE ENDS AND THE LIKE
Filed July 11, 1952
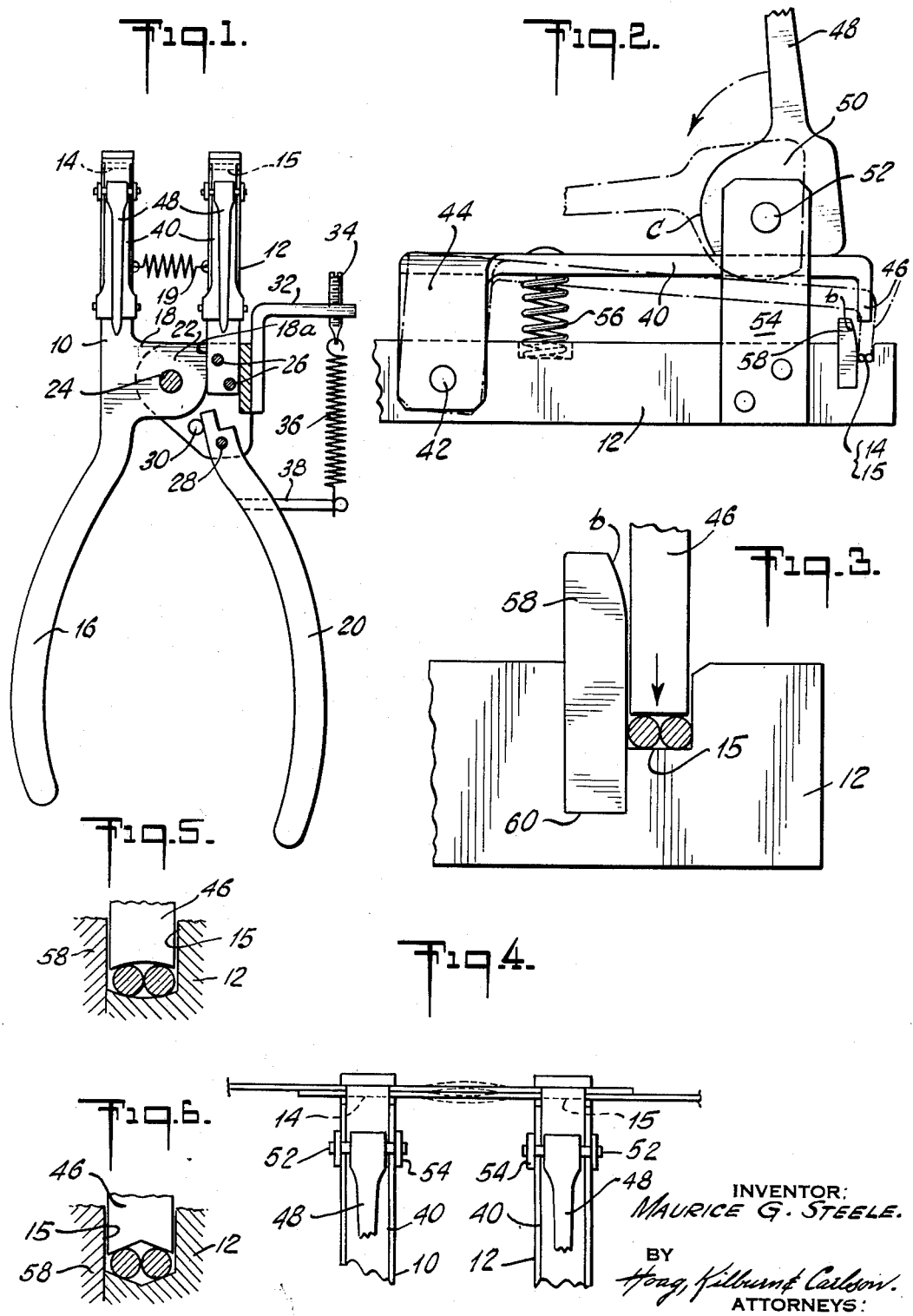
INVENTOR:
MAURICE G. STEELE.
BY
Hoag, Kilburn & Carlson.
ATTORNEYS:

United States Patent Office 2,737,917
Patented Mar. 13, 1956

2,737,917
DEVICE FOR POSITIONING AND STRAIGHTENING WIRE ENDS AND THE LIKE

Maurice G. Steele, Rome, N. Y., assignor to Rome Cable Corporation, Rome, N. Y., a corporation of New York Application July 11, 1952, Serial No. 298,329

2 Claims. (Cl. 113—99)

This invention relates to an article positioning device. One of the principal uses contemplated for this device is the positioning of filamentary articles of widely varying diameter, including wires, wire ropes, cables and the like, to facilitate joining together a plurality of such articles, as for example by brazing, soldering or welding. Accordingly the invention also relates to an improved method for positioning, stretching and holding together in overlapping relationship a plurality of wire ends, the term "wire ends" being used broadly herein to include portions of filamentary articles including wires, wire ropes and cables which it is desired to bring together.

An object of the invention is to provide a simple method and apparatus of the above mentioned kind.

Another object of the invention is to provide a method which is quick and effective and a tool which is inexpensive to construct and easy to operate.

Another object of the invention is to provide method and means for positioning wire ends in proper physical relationship while joining them together, and to overcome the tendency of the wire ends to warp out of position when heated, as for example during a soldering or brazing operation.

Another object of the invention is to provide method and means well adapted to hold in continuous contact the ends of very small wires, such for example as the braided ends of steel wire of .015 in. in thickness.

Other objects of the invention will be in part obvious or in part pointed out hereinafter.

The invention accordingly consists in the features of construction, combinations of elements, arrangements of parts, and in the several steps and relation and order of each of said steps to one or more of the others thereof, all as will be pointed out in the following description, and the scope of the application of which will be indicated in the following claims.

The invention will best be understood if the following description is read in connection with the drawings, in which, Figure 1 is a plan view of an embodiment of the invention;

Figure 2 is a fragmentary side elevational view;

Figure 3 is a detailed view on an enlarged scale of a portion of the structure shown in Figure 2;

Figure 4 is a schematic fragmentary view illustrating how tension applied to wire ends keeps them from warping and overcomes bending or spreading apart of overlapped portions of wire ends; and Figures 5 and 6 are fragmentary views similar to Figure 3, showing slightly modified coacting surfaces for the lower end of the clamp tip and the bottom of the clamp receiving groove.

In the embodiment of the invention shown herein a tool is provided which in some respects resembles a pair of pliers or wire cutters. It comprises two arms each having cross grooves or recesses disposed in substantial alignment transversely of said arms, means for clamping wire ends within said grooves, and means for moving one arm relative to the other to set up tension in wire ends clamped in said grooves to dispose and keep them taut and parallel, even when heated.

As shown herein the device comprises arms 10 and 12 which are initially disposed in parallel relation. The arms are provided with similar transverse grooves or recesses 14 and 15, which are relatively shallow and, by way of preferred example are illustrated as rectangular in form, and are disposed in alignment laterally of the tool.

As shown arm 10 is the forward portion of a member the rear portion of which constitutes handle 16, and which has intermediate its ends a lateral projecting portion 18 which constitutes a male hinge member. Arm 12 is not integral with a handle portion but both it and its control handle 20 are supported by, and extend in opposite directions from, a forked female hinge member 22. As shown herein, member 22 is U-shaped and receives between its forks the male hinge member 18 to which it is pivotally engaged by means of pivot pin 24. The rear end of arm 12 is received between the forks of hinge member 22 and secured therein by means of pins 26. The forward end of handle 20 is received between the forks of the hinge member 22 and pivotally mounted between said forks on pivot 28. The motion of handle 20 is restricted in a counter-clockwise direction by stop pin 30 extending between the forks of said hinge member 22. Attached to, and extending forwardly from hinge member 22 is a spring support 32, shown as an angle bracket one arm of which is attached to said hinge member 22 and the other arm of which projects laterally from the hinge and arm assembly and is apertured to receive a spring adjusting screw 34. A tension spring 36 is interconnected between said screw 34 and a spring post 38 which is fixed to, and projects laterally from, handle 20 on the far side of pivot 28 from arm 12. Normally spring 36 is under a slight tension sufficient to hold handle 20 against stop pin 30 as shown in Figure 1.

The forward portion of the inner edge of hinge member 18 is extended in a straight line forming a stop or abutment 18ᵃ against which the inner edge of arm 12 abuts when it is in parallel relation to arm 10 and a light spring 19 is provided between arms 10 and 12 normally urging arm 12 against abutment 18ᵃ. Thus counter-clockwise movement of arm 12 is limited and the arms 10 and 12 cannot move closer together than a position of parallelism, but by squeezing the handles 16 and 20 force is exerted through arm 20 to spring 36 thereby overcoming the force of spring 19 and further tensioning spring 36 and through it exerting force on hinge 22 and arm 12 tending to rotate arm 12 on pivot 24 clockwise, in a direction away from arm 10.

Where the device is to be used for positioning and holding two wire ends in overlapping parallel relation while they are joined together it is desirable that the grooves 14 be slightly larger than twice the diameter of the wire ends which are to be joined so that the wire ends may be held parallel and in close contact with one another. Clamping of wire ends or other objects within the grooves may be accomplished by a variety of means, the preferred means shown herein being identical for both arms 10 and 12 and comprising the U-shaped member 40 pivotally mounted adjacent the end of one leg on pivot 42 supported in bearing means 44 projecting upwardly from the support arm 10 or 12. The other leg of member 40 is directed downwardly toward the groove in the support arm and its tip 46 is forced downwardly into the groove and into contact with an object or objects therein by operation of cam handle 48 which has an integral cam head 50 mounted for rotation on pin 52 extending between the support members 54 projecting upwardly from opposite sides of the support arm. In Figure 2 an assembly is shown comprising the forward portion of support arm 12 together with a clamp 40 and its cam control means. As shown in Figure 2 the cam lever is in released (vertical) position. As the lever is rotated counter-clockwise face C of the cam forces the free end of the pivoted wire clamp downward causing the tip 46 of the clamp to move down into the wire clamping groove 15, into the position shown in Figure 3, which is the position of both clamps as shown in Figure 1.

It has been found that the wires to be joined are held together very securely when the bottom of grooves 14, 15 are made substantially concave or trough-shaped and the contact surface of the tip portion 46 of the clamps are made oppositely curved or inclined, as shown in Figures 5 and 6 respectively.

Desirably a spring 56 is provided intermediate the support arm 10 or 12 and the clamp 40 to raise the tip 46 of the clamp when the cam is again moved to release position.

Adjacent the groove 14 or 15 of each support arm a guide member 58 is provided the lower end of which is seated in a recess 60, which opens into, and extends below, the groove, and the upper portion of which projects above the support arm and at right angles to it. It will be seen that the front surface of member 58 defines the rear wall of the groove and serves to guide into the groove wire ends or other objects which it is desired to clamp in said groove. As shown the face of the guide member which is toward the groove is rounded or bevelled at $b$ adjacent its upper end to increase its usefulness as a guide.

The device disclosed herein is simple and easy to make and provides a very effective means for positioning objects, particularly in parallel overlapping relation. It is simple, quick and effective in use and operation. If, for example, it is desired to join two wire ends as by brazing the operation is as follows: with both cam handles 48 in vertical position the wire ends are inserted first in the groove or recess 14 or 15 as the case may be, of one support arm, and clamped therein by depressing the cam handle of the cam means on that support arm. The wire ends are then held in the operator's fingers and pulled in a direction away from the closed clamp while being inserted and clamped in the groove of the other support arm. If the wires are to be silver brazed, a past mixture of silver solder powder, flux and water should be applied to the center portion of the wire span between the two clamping arms. The operator then grips the handles 16 and 20 and presses them together while applying heat to the wire ends at the point where they are to be joined together, as by a gas torch or a small alcohol burner.

Pressing handles 16 and 20 together as described above overcomes the tension of spring 19 and further tensions the spring 36, and this tension is transmitted through arm 12 to the span of the wire ends between the support arms 10 and 12. It will be found that the tension thus produced in the wires, tending to elongate them, will effectively keep them taut and paralell even when heated, and a parallel, streamlined, efficient brazed joint will result. In the absence of tension tending to elongate them the wire ends tend to warp apart as shown in dotted lines in Figure 4, and it is very difficult to obtain a good compact joint.

Another useful and important function of tensioning the wire ends is to straighten out the wire span before heat is applied. If the wires are bent and twisted so that they do not readily straighten when tensioned the handles of the tool should be squeezed together as far as they will go and the stressed wires struck sharply but lightly several times with a small tool such as a pair of pliers or a screw driver, and it will be found that the wires will tend to straighten out and become parallel.

After the brazed joint has been formed the cam handles 48 are raised to vertical position, instantly releasing the joined wires. The loose ends of the wires may then be broken off and removed by repeated flexure or by cutting as with wire cutters.

The method and apparatus disclosed herein have given very satisfactory results in connection with brazing stainless steel wire of very small diameter such for example as .015 in. diameter. Such stainless steel wire is used for example in making insulated cable and is braided over the conductors comprising the cable and imbedded in the insulation sheath. This wire is very hard and springy and has a tensile strength on the order of 300,000 lbs. When it breaks there is very little space within which to work, and it has heretofore been very difficult to position the wire ends by any available or known means to effect a satisfactory braze. When a single one of these brazes parts it leaves a very stiff end which protrudes through the seath of the cable and causes rejection of the length. Use of the device disclosed herein has substantially reduced the rejections experienced due to parting of brazes or welds and has also substantially reduced the time for making such brazes or welds.

It will thus be seen that there has been provided by this invention a method and apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

What I claim is:

1. A device for positioning one article in relation to another which comprises, a pair of substantially parallel arms having registering transverse grooves adjacent their upper ends, a pivoted, cam actuated clamping member mounted on each arm, each of said members having an outer extension which enters the groove, each of said arms having a laterally extending ear with a perforation therethrough, a pin extending through said perforations to form a pivot for said arms, one of said arms having an integral handle projecting below said pivot on the same side of said pivot as said one arm, the other of said arms having a pivotally mounted handle extending below said first pivot and on the same side of said first pivot as said other arm, said other arm having a lateral projection extending above and in a direction normal to said first pivot and away from said one arm, said pivotally mounted handle having a lateral projection extending below both pivots and parallel to said lateral projection, a spring connected across said lateral projections, and a spring connected across said arms.

2. A device for positioning one article in relation to another which comprises, a pair of substantially parallel arms having registering transverse grooves adjacent their upper ends, clamp means individual to each arm for clamping an article in said groves respectively, each of said arms having a laterally extending portion, said portions being overlapped and interconnected by a common pivot pin, one of said arms having an integral handle projecting below said pivot, the other of said arms having a handle pivotally connected to it by a pivot located below said first pivot and on the same side of said first pivot as said other arm, said other arm having a lateral projection extending from it above said first pivot and away from said one arm in the plane of said arms, said pivotally mounted handle having a lateral projection projecting from below both pivots and substantially parallel to said lateral projection, a spring connected across said lateral projections, and a spring connected across said arms.

References Cited in the file of this patent

UNITED STATES PATENTS

| | | |
|---|---|---|
| 483,320 | Chamberlain | Sept. 27, 1892 |
| 777,006 | Conrad | Dec. 6, 1904 |
| 855,031 | Winter | May 28, 1907 |
| 1,125,253 | Barber | Jan. 19, 1915 |
| 1,329,226 | Cervenka | Jan. 27, 1920 |
| 1,351,598 | Wise | Aug. 31, 1920 |
| 1,951,953 | Tollonitsch | Mar. 20, 1934 |
| 2,136,538 | Borwick | Nov. 15, 1938 |
| 2,279,068 | Siebrandt | Apr. 7, 1942 |
| 2,373,478 | Kuhn | Apr. 10, 1945 |
| 2,570,106 | Gagnon | Oct. 2, 1951 |

FOREIGN PATENTS

| | | |
|---|---|---|
| 895,796 | France | Feb. 2, 1945 |